S. A. MARTINEK.
PRIMING CUP.
APPLICATION FILED MAY 28, 1920.
1,373,625.
Patented Apr. 5, 1921.
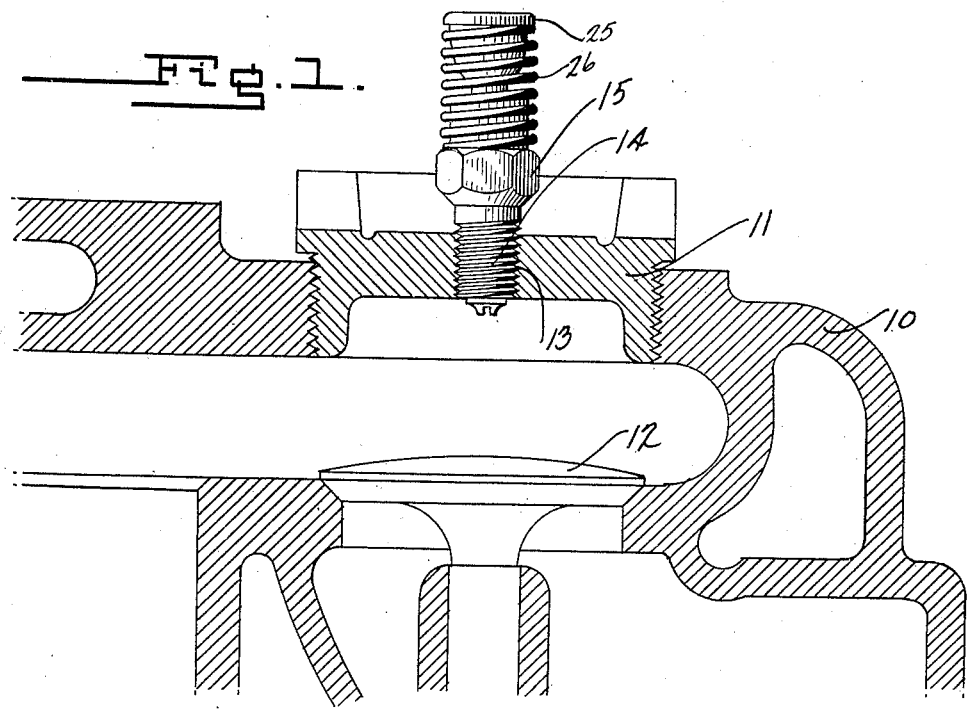
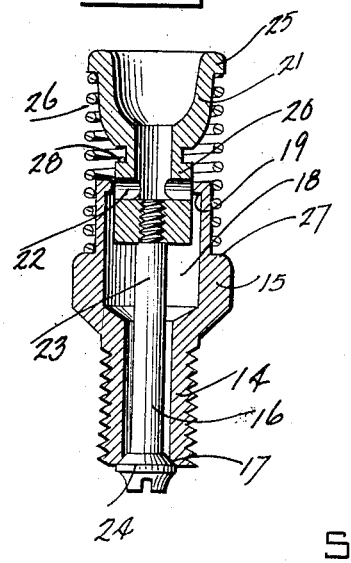
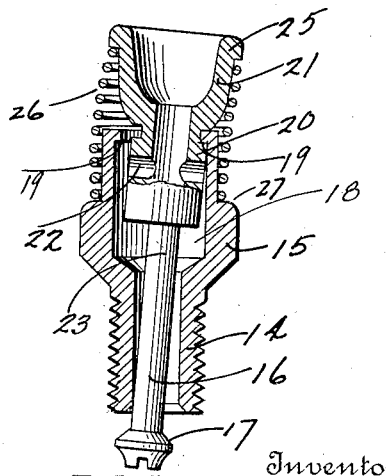
Inventor
Stanley A. Martinek

UNITED STATES PATENT OFFICE.

STANLEY A. MARTINEK, OF AMARILLO, TEXAS.

PRIMING-CUP.

1,373,625.   Specification of Letters Patent.   Patented Apr. 5, 1921.

Application filed May 28, 1920. Serial No. 384,972.

*To all whom it may concern:*

Be it known that I, STANLEY A. MARTINEK, a citizen of the United States, residing at Amarillo, in the county of Potter and State of Texas, have invented certain new and useful Improvements in Priming-Cups, of which the following is a specification.

The present invention relates generally to internal combustion engines, and more particularly to an improved priming cup to be used in connection with the same.

The present invention constitutes an improvement in the structure shown in Patent No. 1,329,464, granted February 3, 1920, and has for an object to provide an improved structure wherein the spring used for closing and maintaining closed the valve of the cup is located in such position as not to be injured by the excessive heat from the engine.

Another object of the invention is to provide a simplified construction of priming cup of this character which will accommodate a relatively large spring for insuring the closing of the priming cup when it is released.

With these and further objects in view as will in part hereinafter become apparent and in part be stated, the invention comprises certain novel constructions, combinations and arrangements of parts as subsequently specified and claimed.

In the accompanying drawings,—

Figure 1 is a fragmentary sectional view through the head portion of an internal combustion engine, showing a priming cup constructed according to the present invention applied thereto.

Fig. 2 is a longitudinal section through the priming cup in closed position.

Fig. 3 is a similar view showing the cup in open position.

Referring to the drawings, wherein like parts are designated by similar numerals of reference throughout the several views, 10 indicates the head of a cylinder of an internal combustion engine and which may be provided with the threaded cap 11 adapted for removal in grinding, adjusting and otherwise working upon the valve 12.

In the present illustration, the cap 11 is shown as supporting the priming cup, and for this purpose is provided with a threaded bore 13 in which the shank 14 of the priming cup is engaged. The priming cup comprises a body portion 15 of hollow construction having an angularly faced intermediate part forming a nut facilitating the screwing of the shank 14 into and out of the threaded opening of the engine. The shank 14 has an axial opening 16 therethrough terminating at the lower end of the shank in a conical valve seat 17. The axial opening 16 is flared or enlarged above the shank 14 to form a chamber 18, which is of relatively large diameter. The upper end of the body 15 has an inturned flange or shoulder 19, and the marginal edge of the shoulder forms a bearing for the reception of a stem 20 of a cup 21 which is mounted on top of the body 15. The stem 20 is hollow and communicates with the bottom of the cup 21, and is provided with one or more lateral ports 22 which open into the chamber 15. The stem 20 has a threaded opening in its lower end into which is detachably threaded the upper end of a valve stem 23, the same projecting downwardly through the bore 16 and beyond the lower end of the shank 14, where the valve stem has a conical head 24 forming a valve adapted to engage the seat 17. The cup 21 has an outstanding flange 25 on its upper end beneath which engages a spring 26, the same disposed about the cup 21 and about the upper end of the body 15, and seating at its lower end on an annular shoulder 27 formed at the top of the nut portion of the body. The spring 16 tends to expand, normally, and raise the cup 21 to draw the valve stem 23 upward and seat the valve 24 to close the lower end of the shank 14. The bore 16 is of greater diameter than that of the valve stem 23 so as to form a passage down through the body when the valve 24 is open. The stem 20 of the cup 21 has an annular groove or shoulder 28 formed therein at a point which is normally above the shoulder 19 of the body and in position to engage the shoulder 19 when the cup 21 is depressed against the tension of the spring 26.

In using the device when the shank 14 is threaded in the head of the engine and it is desired to introduce a priming or other fluid into the engine, it is only necessary to depress the priming cup 25 against the tension of the spring 26 sufficiently to bring the shoulder 28 into line with the shoulder 19, and to tilt or cant the cup 25 toward one side, as shown in Fig. 3, whereby the shoulder 28 engages beneath the shoulder 19 and locks the cup 25 in lowered position. As the cup 25 is depressed the valve 24 is unseated from the lower end of the stem 14 so that there is a through passage in the body of the device and fluid introduced in the cup 25 flows through the stem 20 thereof and out of the one or more lateral ports 22 into the chamber 18. From the chamber 18, the fluid passes down through the enlarged bore 16 and out past the valve seat 17 into the engine cylinder. The spring 26 is of sufficient diameter to freely inclose the upper end of the body 15 and to receive the cup 25 therein. It will be noted that the cup 25 is provided with a reduced lower end imparting a funnel shape to the cup, and at the same time permitting the free flexing or bending of the spring laterally to engage the shoulder of the cup with the shoulder on the body 15.

It is, of course, understood that various changes and modifications may be made in the details of construction and design of the above specifically described embodiment without departing from the spirit of this invention, such changes and modifications being restricted only by the scope of the following claims.

What is claimed is:—

1. A priming cup comprising a body portion having a through opening and provided with a depending threaded shank for engagement through a cylinder wall, a cup slidably mounted upon the upper end of the body portion, a valve controlling the through port at the lower end of the body portion and having connection with the cup, and a spring arranged about the upper end of the body portion and about the cup for normally urging the latter upward to seat said valve.

2. In a priming cup, a body having an opening therethrough, a cup slidably mounted on the upper end of the body and communicating with the opening, a valve carried by the cup for closing the opening when the cup is raised, a spring arranged exteriorly of the body and the cup for urging the latter normally upward, and means for locking the cup to the body when the cup is depressed.

3. In a priming cup, a hollow body having an inturned shoulder at its upper end and a valve seat in its lower end, a cup having a depending shank projecting into the upper end of the body and provided with an upwardly facing shoulder, a valve stem connected to the cup stem and having a valve upon its lower end adapted to engage the valve seat for closing the passage through the hollow body when the cup is elevated, said body having an upwardly facing shoulder in its exterior wall and said cup having a downwardly facing shoulder in its exterior wall, and a spring inclosing the cup and the upper end of the body and engaging at opposite ends said shoulders for normally urging the cup upward, said cup being adapted to be depressed whereby the shoulder of the cup stem and the shoulder of the body are adapted to interlock for holding the cup and the valve in depressed position.

4. A priming cup comprising a hollow body adapted to be mounted in a cylinder wall, a cup slidably mounted on the upper end of the body and having a valve controlling the passage through the body, a spring arranged exteriorly upon the body and the cup for normally urging the cup upward to seat the valve and close the passage through the body, and interlocking means on the cup and body for locking the cup from upward movement when depressed, and being releasable upon a lateral movement of the cup.

5. A priming cup comprising a body provided with a shoulder and with an axial bore having an enlarged portion, a cup member provided with an exterior flange and with a depending stem mounted for movement within the enlarged portion of said bore, said stem being provided with vertical and cross bores communicating with said cup and said enlarged portion of said bore, a valve stem rigid with said cup stem and passing through said bore, a valve on said valve stem adapted to control the passage of fluid through said bore, an exterior spring mounted between said shoulder and flange adapted to normally maintain said valve closed, and means adapted to hold said valve open when said cup member is depressed against the compression of said spring.

STANLEY A. MARTINEK.